INVENTOR
Marcel Meunier
By Shoemaker & Mattare
ATTORNEYS

Oct. 27, 1953 M. MEUNIER 2,657,062

DICTATING MACHINE

Filed July 14, 1950 2 Sheets-Sheet 2

INVENTOR
Marcel Meunier
By Shoemaker & Mattare
ATTORNEYS

Patented Oct. 27, 1953 2,657,062

UNITED STATES PATENT OFFICE 2,657,062

DICTATING MACHINE

Marcel Meunier, Cuesmes, Belgium, assignor to Ateliers de Constructions Electriques de Charleroi, Brussels, Belgium, a Belgium societe anonyme Application July 14, 1950, Serial No. 173,907
In France July 19, 1949

5 Claims. (Cl. 274—11)

The present invention relates to dictating machines in which the sound recording and reproduction are effected by magnetic means, as known per se. These dictating machines have the considerable advantage with respect to machines utilising other methods that no preliminary operation prior to recording is required, since the erasure of sounds already recorded by magnetic means is effected at the same time as a fresh recording. This property allows the immediate reutilisation of the magnetograms or magnetic records, as soon as their reproduction is completed.

The present invention relates to a dictating machine with exploration by successive parallel lines and alternately in one direction and in the other, which brings into operation an improved arrangement eliminating certain disadvantages encountered previously.

According to the invention, a dictating machine, of the kind in which the sound recording and reproduction are effected by magnetic means as known per se, and comprising a driving motor, a support for a magnetic record in the form of a magnetizable sheet, one or more magnetic recording, reproducing and erasing heads, and means for exploring the record by successive parallel lines, alternately in one direction and in the other, is characterized in that the record is given a continuous movement of translation, while the magnetic heads are given alternate movements in approximately perpendicular directions, the first movement being a continuous exploration in a direction slightly inclined to the parallel recording lines, and the next movement being a displacement at each end of a line of exploration in a direction parallel but inverse to the direction of motion of the record, by the width of a record line spacing, in such a way that during the exploration of a line of the record, the relative movement of the magnetic heads with respect to the record is formed by a movement of continuous translation at right angles to the direction of motion of the record.

The dictating machine is arranged in such a way that:

(1) The magnetic heads travel along a path slightly inclined with respect to a line at right angles to the direction of continuous motion of the record;

(2) The path of the magnetic heads is formed by an oscillating track member pivotally mounted at its center and possessing two positions of stable equilibrium, slightly inclined on either side of a line at right angles to the direction of continuous motion of the record, the interval between these two positions, at each end of the path, corresponding to the spacing distance between two adjacent record lines;

(3) The oscillating track member forming the path of the magnetic heads is made stationary in one or other of its two positions of stable equilibrium, according as the magnetic heads are travelling in one direction or in the other, along a line slightly inclined with respect to a line at right angles to the direction of continuous motion of the record, so that the relative displacement of the magnetic heads with respect to the record shall coincide in each case with a line of exploration of the record;

(4) The pivotal movement of the oscillating track member from one to the other of its two positions of stable equilibrium, is performed at each end of a line of exploration of the record, the magnetic heads, their support or an auxiliary member actuating suitable mechanical or electro-mechanical devices at each end of the path or travel;

(5) The travel of the magnetic heads, in one direction or the other, is produced by means controlled either mechanically or electro-mechanically, the reversal of the direction of travel being effected at each end of the line of exploration of the record during the pivotal movement of the oscillating track member from one to the other of its two positions of stable equilibrium.

Other features and advantages of the invention will appear from the following description, given with reference to the accompanying drawings, in which.

Figure 1:
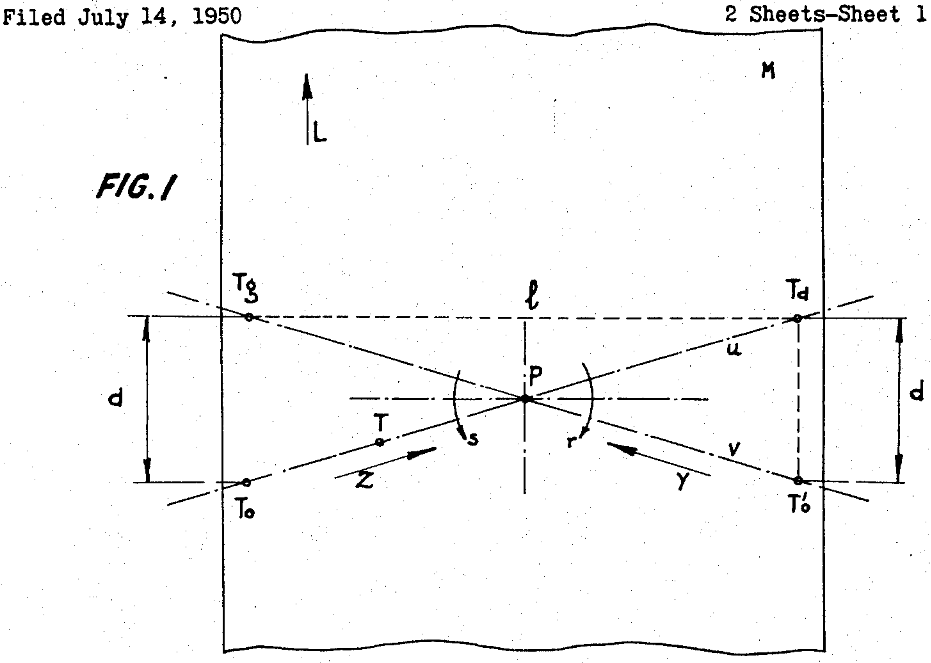
Fig. 1 is an explanatory diagram of a dictating machine according to the present invention.

In Fig. 1, M designates the record or magnetogram which is given a movement of continuous translation in the direction of the arrow L at a speed V such that the distance traversed after a time $t$ is equal to:

$$d = V.t$$

The path of travel of the magnetic heads is symbolized by the two axes $u$ and $v$, equally inclined on opposite sides with respect to a line $o$ at right angles to the direction of continuous motion of the record M.

The magnetic heads, represented symbolically by the variable point T, are initially located at To and travel along the axis $u$ in the direction of the arrow $z$, at a speed V′ such that they reach the end T$d$ of the axis $u$ at the end of the time $t$.

When the magnetic heads are at T$d$, the path of travel of the magnetic heads swings around the central pivot P in the direction of the arrow $r$ until it coincides with the axis $v$. The magnetic heads are therefore brought to the position T′$o$ and they are now given a movement along the axis $v$, in the direction of the arrow $y$, at the same speed as previously.

When the magnetic heads reach the point T$g$ at the other end of the axis $v$, an analogous swinging movement of the path of travel of the magnetic heads is produced, but this time in the direction of the arrow $s$.

The interval or distance $d$ separating the two positions T$d$ and T′$o$, or T$g$ and T$o$ at each end of the travel is equal to the distance traversed by the record at the end of the time $t$, during which time the magnetic heads effect the travel T$o$—T$d$, or T′$o$—T$g$, along their path.

It is easily understood that, in this way, the record is explored along a line $l$ at right angles to the direction of continuous movement of the record. At the end of this line, the magnetic heads are displaced in a direction contrary to that of this movement with respect to the record, by the distance $d$ which is chosen equal to the distance separating two adjacent parallel record lines.

Figure 2:
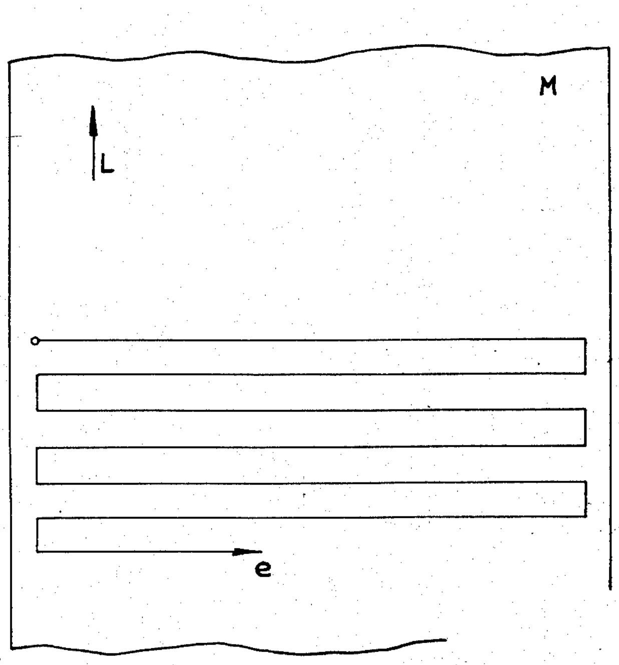
Fig. 2 illustrates the shape of the exploration lines upon the record or magnetogram.

The exploration $e$ of the magnetogram has therefore the shape represented in Fig. 2 of the drawings.

Figure 3:
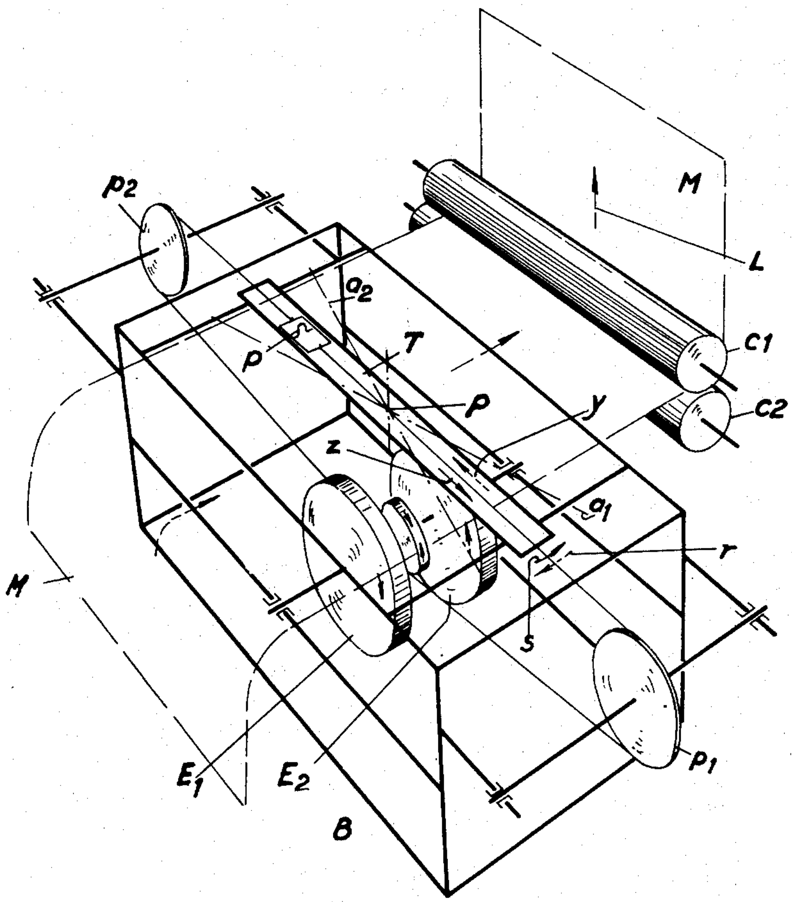
Fig. 3 represents diagrammatically a form of construction of the improved dictating machine.

Fig. 3 represents diagrammatically, by way of example, a form of construction of dictating machine according to the present invention.

The frame B supports an oscillating member R forming a track for the reciprocation of the magnetic heads H. This oscillating track R is movable in a horizontal plane around a central pivot $p$ and can occupy one or other of two positions of equilibrium, represented by the axes $a_1$ and $a_2$ corresponding to the axes $u$ and $v$ in Fig. 1; in order to facilitate comprehension, the oscillating track member R has been shown in an intermediate position along the bisector of the angle formed by the axes $a_1$ and $a_2$. The magnetic heads H are given a movement of continuous travel to and fro at constant speed over the oscillating track member R by a system of cables driven by the clutches $E_1$ and $E_2$, with jockey pulleys $p_1$ and $p_2$.

When the oscillating track member R is held stationary in the position marked by the axis $a_1$, the magnetic heads H travel in the direction of the arrow $z$, being driven by the clutch $E_1$. At the end of the stroke, the oscillating track member R is brought automatically (by means not represented) from its position along the axis $a_1$ into a position along the axis $a_2$, by swinging around its central pivot $p$ in the direction of the arrow $r$. The travel of the magnetic heads H is then produced by the clutch $E_2$ and the magnetic heads are carried back in the direction of the arrow $y$. At the end of this travel, the oscillating track member R turns again around its central pivot $p$ in the direction of the arrow $s$, thus resuming its initial position.

The record represented at M is fed forward by the cylinders $C_1$ and $C_2$ and is given a movement of uniform translation in the direction of the arrow L, in such a way that the interval between two successive positions of the magnetic heads on one and the same side of the record corresponds to the distance between two adjacent record lines thereon.

What I claim is:

1. A dictating machine having magnetic means for sound recording and reproduction, for use with records in the form of magnetic strips adapted to bear sound-recordings in parallel lines extending across the minor dimensions of the strip and at right angles to the major dimension of the strip, said machine comprising a magnetic recording and reproducing head, an oscillatable track pivoted intermediate its length and supporting said magnetic head for movement along the track, said track extending across the minor dimension of the strip and movable about its pivot from one position in inclined relation to a line at right angles to the major dimension of said strip to another in which it extends transversely of the said inclined position, means for moving said strip at a substantially constant speed in the direction of its major dimension, means for moving said magnetic head along said oscillatable track longitudinally thereof at a substantially constant speed in a reciprocating movement registering with record lines on said strip, and means operable at the end of each movement of said magnetic head along a record line to effect reversal of the inclination of said oscillatable track about the pivot constituting its center of oscillation and cause said magnetic head to register with the next record line.

2. A dictating machine having magnetic means for sound recording and reproduction, for use with records in the form of magnetic strips adapted to bear sound-recordings in parallel lines extending across the minor dimension of the strip and at right angles to the major dimension of the strip, said machine comprising a magnetic recording and reproducing head, an oscillatable track pivoted midway its length and supporting said magnetic head for movement along the track between ends thereof, said track extending across the minor dimension of the strip and movable about its pivot from one position in inclined relation to a line at right angles to the major dimension of said strip to another position in which it extends transversely of the said inclined position, means for bringing about a co-active operation between said strip, said magnetic head and said oscillatable track, including means for moving said strip at a substantially constant speed in the direction of its major dimension, means for moving said magnetic head along said oscillatable track at a substantially constant speed in a reciprocating movement registering with record lines on said strip, and means operatable at the end of each movement of said magnetic head along a record line to effect reversal of the inclination of said oscillatable track about the pivot constituting its center of oscillation and cause said magnetic head to register with the next record line.

3. A dictating machine having magnetic means for sound recording and reproduction, for use with records in the form of magnetic strips adapted to bear sound-recordings in parallel lines extending across the minor dimension of the strip and at right angles to the major dimension of the strip, said machine comprising a magnetic recording and reproducing head, an oscillatable track supporting said magnetic head for sliding movement along the track between ends thereof, a pivot for said oscillating track, said pivot being located centrally of said track and substantially midway the length of the center-line of the track, said track extending across the minor dimension of the strip and movable about its pivot to diagonal positions at a small angle on one side to the other side of a line at right angles to the major dimension of said strip, means for moving said strip at a substantially constant speed in the direction of its major dimension, means for moving said magnetic head along said oscillatable track at a substantially constant speed in a reciprocating movement registering with record lines on said strip, and means operatable at the end of each movement of said magnetic head along a record line to effect reversal of the inclination of said oscillatable track about said pivot and cause said magnetic head to register with the next record line.

4. A dictating machine having magnetic means for sound recording and reproduction, for use with records in the form of magnetic strips adapted to bear sound-recordings in parallel lines extending across the width of the strip and at right angles to the length of the strip, said machine comprising a magnetic recording and reproducing head, an oscillatable track supporting said magnetic head for sliding movement along the track, a pivot for said oscillating track located midway the width of said track and substantially midway the length of the center-line of the strip, said track extending across the width of the strip and being tiltable about its pivot to diagonally extending positions at right angles to each other across the major dimension of said strip, rollers for moving said strip at a substantially constant speed along its center-line over said oscillatable track and magnetic head, means for moving said magnetic head along said oscillatable track at a substantially constant speed in a reciprocating movement registering with record lines on said strip, and means operable at the end of each movement of said magnetic head along a record line to effect reversal of the diagonal position of said oscillatable track about its center of oscillation and cause said magnetic head to register with the next record line.

5. A dictating machine having magnetic means for sound recording and reproduction, for use with records in the form of magnetic strips adapted to bear sound recordings in parallel lines extending across the minor dimension of the strip and at right angles to the major dimension of the strip, said machine comprising a magnetic recording and reproducing head, an oscillatable track supporting said magnetic head for movement along the track, a pivot for said oscillatable track located midway the width of said track and substantially midway the length of the center-line of the strip, said track extending across the minor dimension of the strip and being movable about its pivot from a position at a small angle to one side or the other of a line at right angles to the major dimension of said strip, rollers for moving said strip at a substantially constant speed in the direction of its major dimension, a cable system for moving said magnetic head along said oscillatable track at a substantially constant speed in a reciprocating movement registering with record lines on said strip, said cable system including alternately-acting pulleys controlled by clutches movable into and out of operative positions, and means operable at the end of each reciprocation of said magnetic head along a record line to effect reversal of the inclination of said oscillatable track about said pivot to cause said magnetic head to register with the next record line, said clutch-controlled pulleys then being moved into position for reversing the movement of said magnetic head along said oscillatable track.

MARCEL MEUNIER.

References Cited in the file of this patent

UNITED STATES PATENTS

| Number | Name | Date |
|---|---|---|
| 911,146 | Mercau | Feb. 2, 1909 |
| 1,089,835 | Gregory | Mar. 10, 1914 |
| 2,124,673 | Puma | July 26, 1938 |

FOREIGN PATENTS

| Number | Country | Date |
|---|---|---|
| 4,825 | Great Britain | Feb. 27, 1906 |
| 877,126 | France | Nov. 27, 1942 |